(12) United States Patent
Dodo

(10) Patent No.: US 10,626,988 B2
(45) Date of Patent: Apr. 21, 2020

(54) VEHICLE CONTROL APPARATUS

(71) Applicant: TOYOTA JIDOSHA KABUSHIKI KAISHA, Toyota-shi, Aichi (JP)

(72) Inventor: Kohei Dodo, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 15/869,955

(22) Filed: Jan. 12, 2018

(65) Prior Publication Data

US 2018/0202551 A1 Jul. 19, 2018

(30) Foreign Application Priority Data

Jan. 19, 2017 (JP) ................. 2017-007976

(51) Int. Cl.
  *F16H 61/662* (2006.01)
  *F16H 59/46* (2006.01)
  *F16H 59/60* (2006.01)

(52) U.S. Cl.
  CPC ....... *F16H 61/66272* (2013.01); *F16H 59/46* (2013.01); *F16H 59/60* (2013.01); *F16H 2059/465* (2013.01)

(58) Field of Classification Search
  CPC ............................... F16H 2061/66277
  See application file for complete search history.

(56) References Cited

U.S. PATENT DOCUMENTS

| 8,118,707 | B2* | 2/2012 | Brandsma | ............. | B60W 10/02 |
| | | | | | 477/176 |
| 2002/0155910 | A1* | 10/2002 | Nishizawa | ........ | F16H 61/66254 |
| | | | | | 474/69 |
| 2004/0242355 | A1* | 12/2004 | Yamaguchi | ....... | F16H 61/66272 |
| | | | | | 474/18 |
| 2004/0242370 | A1* | 12/2004 | Iwatsuki | ........... | F16H 61/66272 |
| | | | | | 477/45 |
| 2012/0258825 | A1* | 10/2012 | Kodama | ........... | F16H 61/66272 |
| | | | | | 474/69 |
| 2014/0128187 | A1* | 5/2014 | Iraha | ................... | F16H 61/0206 |
| | | | | | 474/8 |
| 2015/0088388 | A1* | 3/2015 | Kanehara | .......... | F16H 61/66272 |
| | | | | | 701/51 |
| 2017/0030463 | A1* | 2/2017 | Takemori | .......... | F16H 61/66272 |

FOREIGN PATENT DOCUMENTS

| JP | 2001-254814 | A | 9/2001 |
| JP | 2002-219957 | A | 8/2002 |
| JP | 2012-027553 | A | 2/2012 |
| WO | 2016/034188 | A1 | 3/2016 |

* cited by examiner

*Primary Examiner* — Tisha D Lewis
(74) *Attorney, Agent, or Firm* — Oliff PLC

(57) ABSTRACT

A control apparatus for a vehicle, which is provided with a drive power source, drive wheels and a continuously variable transmission, includes a friction-force control portion configured to control a friction force acting between a belt and pulleys of the continuously variable transmission, based on a belt-slip information received from an external device located outside the vehicle. The belt-slip information represents at least one belt slippy area in which a belt slippage is more likely to occur in the continuously variable transmission. The friction-force control portion controls the friction force such that the friction force is made larger in the at least one belt slippy area than in other areas in which the belt slippage is less likely to occur in the continuously variable transmission.

14 Claims, 9 Drawing Sheets

VEHICLE CONTROL APPARATUS

This application claims priority from Japanese Patent Application No. 2017-007976 filed on Jan. 19, 2017, the disclosure of which is herein incorporated by reference in its entirety.

FIELD OF THE INVENTION

The present invention relates to a control apparatus for a vehicle provided with a so-called belt-type continuously variable transmission.

BACKGROUND OF THE INVENTION

There is well known a control apparatus configured to control a vehicle by using an information which relates to a behavior of the vehicle and which is associated with an information relating to a location of the vehicle. A vehicle control apparatus disclosed in JP-2002-219957A is an example of this type of control apparatus. This document discloses that an information relating to the behavior of the vehicle is stored in association with the current location of the vehicle, and that the stored information is read out when the vehicle passes through the same point or area again, so that the vehicle is controlled based on the information.

SUMMARY OF THE INVENTION

By the way, there is a case where there is not stored any information relating to the behavior of the vehicle and associated with the current location of the vehicle, for example, when the current position corresponds to an area in which the vehicle runs for the first time. In such a case, the vehicle cannot be controlled based on an information relating to the behavior of the vehicle. For example, in a vehicle provided with a belt-type continuously variable transmission, it might be possible to restrain or prevent a belt slippage in the continuously variable transmission before an actual occurrence of the belt slippage, by increasing a belt clamping force in the continuously variable transmission, based on an information which relates to an occurrence of the belt slippage as the vehicle behavior and which is associated with the information relating to the location of the vehicle. However, as long as the information relating to an occurrence of the belt slippage is not stored, it is not possible to control the vehicle such that the belt slippage is retrained or prevented. If the belt clamping force is increased always where the information relating to an occurrence of the belt slippage is not stored, there is a risk that durability of the belt could be reduced and/or fuel economy could be reduced. It is therefore desirable to control the vehicle such that the belt slippage is appropriately restrained or prevented as needed.

The present invention was made in view of the background art described above. It is therefore an object of the present invention to provide a control apparatus for a vehicle, which is capable of appropriately restraining or preventing a belt slippage in a continuously variable transmission of the vehicle, as needed, before the belt slippage actually occurs.

The object indicated above is achieved according to the following modes of the present invention:

According to a first mode of the invention, there is provided a control apparatus for a vehicle provided with a drive power source, drive wheels and a belt-type continuously variable transmission that is configured to transmit a drive force from the drive power source to the drive wheels. The belt-type continuously variable transmission includes pulleys and a belt that is mounted on the pulleys. The control apparatus includes a friction-force control portion configured to control a friction force acting between the belt and the pulleys of the continuously variable transmission, based on a belt-slip information received from an external device located outside the vehicle. The belt-slip information represents at least one belt slippy area in which a belt slippage is more likely to occur in the belt-type continuously variable transmission. The friction-force control portion controls the friction force such that the friction force is larger in the at least one belt slippy area than in other areas in which the belt slippage is less likely to occur in the belt-type continuously variable transmission. It is noted that the term "area" may be referred also to as "zone" or "region". It is also noted that the control apparatus may generate a belt-slippage occurrence information representing that the belt slippage has occurred in the belt-type continuously variable transmission and associated with a location information representing a location of the vehicle when the belt slippage has occurred, and the control apparatus may transmits the belt-slippage occurrence information to the external device via a transceiver provided in the vehicle. Further, each of the pulleys may have a V-shaped groove which circumferentially extends and which has a variable width, and the friction-force control portion may be a clamping-force control portion configured to control a clamping force, by which the belt held in the V-shaped groove of each of the pulleys is clamped by the pulleys, by controlling the variable width of the V-shaped groove, for thereby controlling the friction force acting in the continuously variable transmission.

According to a second mode of the invention, in the control apparatus according to the first mode of the invention, the belt-slip information is associated with a vehicle situation when the belt slippage occurred, and the friction-force control portion increases the friction force in the continuously variable transmission, based on a comparison between an actual situation of the vehicle and the vehicle situation associated with the belt-slip information.

According to a third mode of the invention, in the control apparatus according to the first or second mode of the invention, the friction-force control portion is configured to control the friction force, based on the belt-slip information received from, as the external device, a center configured to generate the belt-slip information by collecting belt-slippage occurrence informations each of which relates to occurrence of the belt slippage and each of which is associated with a location information.

According to a fourth mode of the invention, in the control apparatus according to the third mode of the invention, the center external device includes, in addition to the center, other vehicles that are other than the vehicle, each of the other vehicles being provided with a continuously variable transmission including pulleys and a belt that is mounted on the pulleys, and the control apparatus receives the belt-slip information from at least one of the other vehicles, when being unable to receive the belt-slip information from the center.

According to a fifth mode of the invention, in the control apparatus according to the fourth mode of the invention, when the control apparatus is unable to receive the belt-slip information from the center and the other vehicles do not have the belt-slip information, the friction-force control portion increases the friction force in the continuously variable transmission of the vehicle, based on a pressure-increase information received from at least one of the other vehicles and representing that a friction force acting between the belt and the pulleys of the continuously variable transmission in each of the at least one of the other vehicles was increased.

According to a sixth mode of the invention, in the control apparatus according to any one of the first through fifth modes of the invention, the friction-force control portion keeps the friction force high, when the vehicle has been out of one of the at least one belt slippy area represented in the belt-slip information and a distance from the vehicle to a next one of the at least one belt slippy area which the vehicle is likely to enter next is shorter than a threshold distance.

According to a seventh mode of the invention, in the control apparatus according to the sixth mode of the invention, when the control apparatus is unable to receive the belt-slip information from the external device, the friction-force control portion increases the friction force in the continuously variable transmission of the vehicle, based on a pressure-increase information received from at least one of other vehicles that are other than the vehicle, each of the other vehicles being provided with a continuously variable transmission including pulleys and a belt that is mounted on the pulleys, the pressure-increase information received from the at least one of the other vehicles representing that a friction force acting between the belt and the pulleys of the continuously variable transmission in each of the at least one of the other vehicles was increased, and when the friction-force control portion increased the friction force in the continuously variable transmission of the vehicle, based on the pressure-increase information received from the at least one of other vehicles, the friction-force control portion keeps the friction force high until a distance from the vehicle to the at least one of other vehicles becomes the threshold distance or more.

According to an eighth mode of the invention, in the control apparatus according to any one of the first through seventh modes of the invention, the belt-slip information is associated with a frequency of occurrence of the belt slippage, and the friction-force control portion changes the friction force in the continuously variable transmission, based on the belt-slip information.

According to any one of the first through eighth modes of the invention, the friction force acting between the belt and the pulleys of the continuously variable transmission is controlled based on the belt-slip information received from the external device, such that the friction force is made larger in the at least one belt slippy area than in the other areas in which the belt slippage is less likely to occur. Thus, even in an area where the vehicle runs for the first time, it is possible to control the vehicle so as to restrain or prevent the belt slippage without necessarily increasing the friction force in the continuously variable transmission in the same manner. Therefore, the belt slippage in the continuously variable transmission can be appropriately restrained or prevented, as needed, before the belt slippage actually occurs.

According to the second mode of the invention, the friction force in the continuously variable transmission is increased based on the comparison between the actual situation of the vehicle and the vehicle situation associated with the belt-slip information, whereby the vehicle is controlled to restrain or prevent the belt slippage, depending the actual situation of the vehicle, so that it is possible to further restrain reduction of the durability of the belt and/or reduction of the fuel economy, which could be caused by increase of the friction force in the continuously variable transmission.

According to any one of the third though fifth modes of the invention, the external device includes the center configured to generate the belt-slip information by collecting the belt-slippage occurrence informations each of which relates to occurrence of the belt slippage and each of which is associated with the location information representing a location of a vehicle when the belt slippage has occurred in the vehicle, so that, even in an area where the vehicle runs for the first time, it is possible to control the vehicle so as to restrain or prevent the belt slippage without necessarily increasing the friction force in the continuously variable transmission in the same manner.

According to the fourth or fifth mode of the invention, when the belt-slip information cannot be received from the center, the belt-slip information is received from the other vehicle or vehicles, so that it is possible to control the vehicle for retraining or preventing the belt slippage by using the belt-slip information even in a case where the vehicle cannot communicate with the center.

According to the fifth mode of the invention, when the control apparatus is unable to receive the belt-slip information from the center and the other vehicles do not have the belt-slip information, the friction force in the continuously variable transmission of the vehicle is increased based on the pressure-increase information received from the other vehicle or vehicles and representing that the friction force acting between the belt and the pulleys of the belt-type continuously variable transmission in the other vehicle or vehicles was increased. Thus, even where the belt-slip information is not available from the center or the other vehicles, it is possible to control the vehicle for restraining or preventing the belt slippage.

According to the sixth or seventh mode of the invention, when the vehicle has been out of one of the at least one belt slippy area and a distance from the vehicle to a next one of the at least one belt slippy area which the vehicle is likely to enter next is shorter than the threshold distance, the friction force is kept high whereby a hunting causing the friction force to be repeatedly increased and reduced at a short cycle can be prevented.

According to the seventh mode of the invention, when the friction force was increased based on the pressure-increase information received from the other vehicle or vehicles and representing that the friction force in the belt-type continuously variable transmission was increased, the friction force is kept high until the distance from the vehicle to the other vehicle or vehicles becomes the threshold distance or more, whereby a hunting causing the friction force to be repeatedly increased and reduced at a short cycle can be prevented.

According to the eighth mode of the invention, the friction force in the continuously variable transmission is changed based on the belt-slip information associated with the frequency at which the belt slippage has occurred, so that the control of the friction force for retraining or preventing the belt slippage can be made appropriately. Further, the friction force in the continuously variable transmission is not required to be increased depending on frequency of occurrence of the belt slippage so that it is possible to further restrain reduction of the durability of the belt and/or reduction of the fuel economy, which could be caused by increase of the friction force.

DETAILED DESCRIPTION OF PREFERRED EMBODIMENTS

In embodiments of the present invention, the above-described continuously variable transmission includes the pulleys in the form of an input-side pulley (primary pulley) and an output-side pulley (secondary pulley), and the belt in the form of a transmission belt mounted on the primary and secondary pulleys, wherein each of the primary and secondary pulleys includes a fixed sheave, a movable sheave and a hydraulic actuator that is configured to apply a thrust for changing a width of a groove defined between the fixed and movable sheaves. The vehicle is provided with a hydraulic control unit configured to control pressures of working fluids (pulley hydraulic pressures), independently of each other, which are supplied to the hydraulic actuators of the respective primary and secondary pulleys. This hydraulic control unit may be arranged to generate the pulley hydraulic pressures consequently by controlling flow rates of the working fluids supplied to the respective hydraulic actuators. Owing to the hydraulic control unit that controls the thrust (=pulley hydraulic pressure*pressure receiving area) applied to each of the primary and secondary pulleys, a shifting control is executed to carry out a desired shifting action with slippage of the transmission belt being prevented. The transmission belt is a compression-type endless annular belt including an endless annular hoop and a multiplicity of thick plate-shaped blocks (elements) which are arranged along the hoop in a direction of thickness of each of the blocks, or alternatively, a tension-type belt constituting an endless annular link chain including link plates alternately superposed and mutually connected at their end portions through connecting pins. Thus, the above-described continuously variable transmission can be broadly interpreted to conceptually encompass not only a belt-type continuously variable transmission but also a chain-type continuously variable transmission.

The above-described drive power source is, for example, an internal combustion engine such as a gasoline engine and a diesel engine generating drive force by combustion of fuel supplied thereto. The vehicle may be equipped with, in addition to a drive force source in the form of the engine, another drive force source in the form of, for example, an electric motor.

The embodiments will be described in detail with reference to the drawings.

First Embodiment

Figure 1:
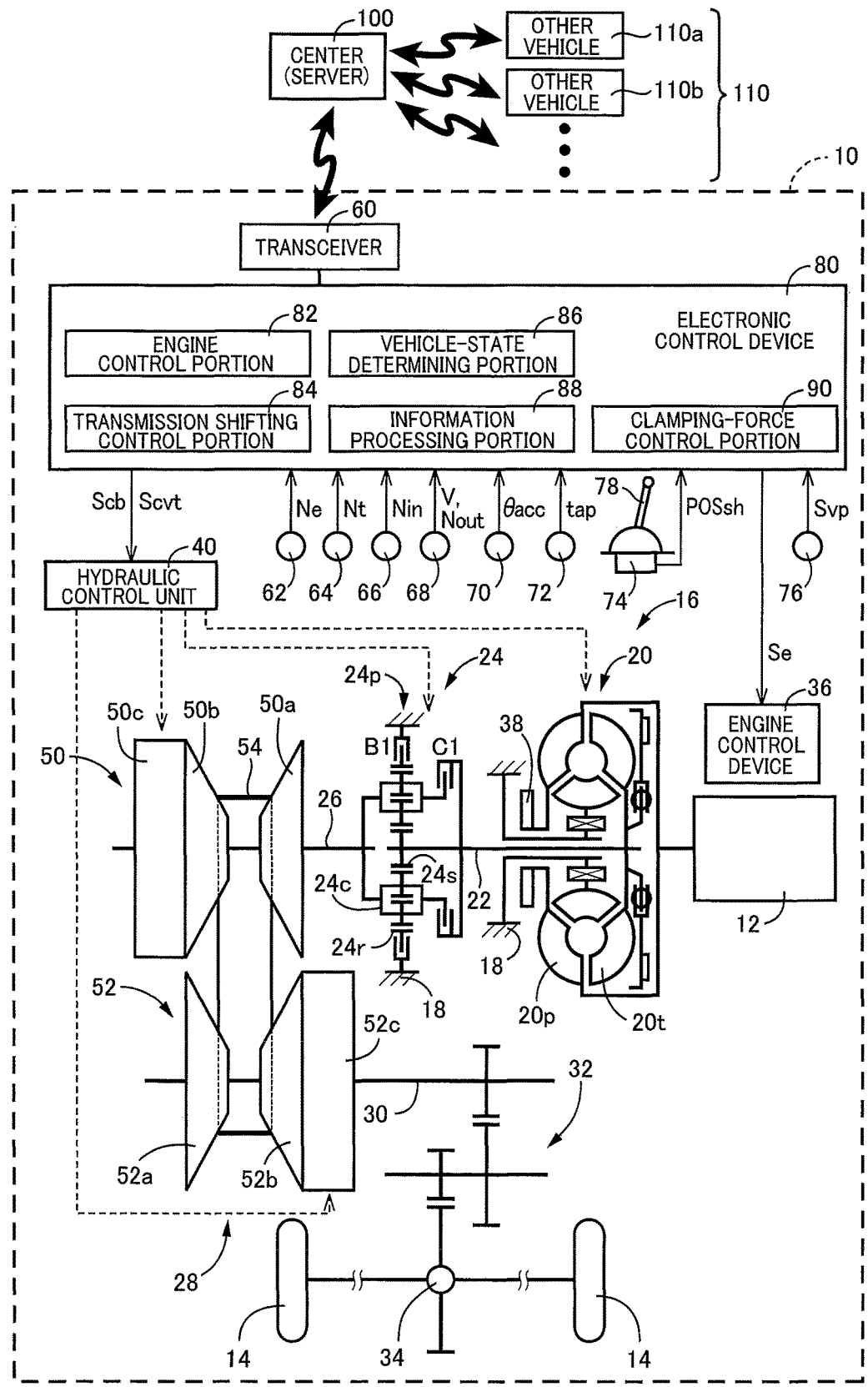
FIG. 1 is a schematic view showing a construction of a vehicle to be controlled by a control apparatus according to the present invention, and major control functions and control portions of the control apparatus.

Reference is first made to FIG. 1, which is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive power source, drive wheels 14 and a power transmission device 16 provided in a power transmitting path between the engine 12 and the drive wheels 14. The power transmission device 16 includes a non-rotary member in the form of a casing 18, a fluid-operated type power transmitting device in the form of a known torque converter 20 that is connected to the engine 12, a turbine shaft 22 connected to the torque converter 20, a forward/reverse switching device 24 connected to the turbine shaft 22, an input shaft 26 connected to the forward/reverse switching device 24, a belt-type continuously variable transmission 28 connected to the input shaft 26, an output shaft 30 connected to the continuously variable transmission 28, a reduction gear device 32 and a differential gear device 34. In the power transmission device 16 constructed as described above, a drive force ("drive torque" or "drive power" unless otherwise distinguished from the drive force) of the engine 12 is transmitted to the right and left drive wheels 14 through the torque converter 20, forward/reverse switching device 24, continuously variable transmission 28, reduction gear device 32, differential gear device 34 and other devices.

The engine 12 is provided with an engine control device 36 including an electronic throttle device, a fuel injection device, an ignition device and other devices that are required for controlling an output of the engine 12. In the engine 12, the engine control device 36 is controlled, by an electronic control device 80 (that will be described below), based on an operation amount θacc of an accelerator pedal that corresponds to a required drive force of the vehicle 10 required by an operator of the vehicle 10, whereby an engine torque Te of the engine 12 is controlled.

The torque converter 20 is provided with a pump impeller 20p and a turbine impeller 20t that are connected to the engine 12 and the turbine shaft 22, respectively. The power transmission device 16 is provided with a mechanical oil pump 38 connected to the pump impeller 20p. The oil pump 38 is to be driven by the engine 12, to supply a working fluid pressure as its original pressure to a hydraulic control unit (hydraulic control circuit) 40 provided in the vehicle 10, for performing a shifting control in the continuously variable transmission 28, generating a belt clamping force in the transmission 28 so as to increase a friction force acting between a transmission belt 54 and primary and secondary pulleys 50, 52 of the transmission 28, and switching an operation state of each of a forward clutch C1 and a reverse brake B1 between its engaged state and released state.

The forward/reverse switching device 24 includes a planetary gear device 24p of double-pinion type in addition to the forward clutch C1 and the reverse brake B1. The planetary gear device 24p includes a sun gear 24s connected to the turbine shaft 22, a carrier 24c connected to the input shaft 26, and a ring gear 24r operatively connected to the casing 18 through the reverse brake B1. The carrier 24c and the sun gear 24s are operatively connected to each other through the forward clutch C1. Each of the forward clutch C1 and the reverse brake B1 is a known hydraulically operated frictional engaging device. With the forward clutch C1 and the reverse brake B1 being placed in the engaged state and the released state, respectively, in the forward/reverse switching device 24, the power transmitting path is established in the power transmission device 16 for driving the vehicle 10 in forward direction. With the reverse brake B1 and the forward clutch C1 being placed in the engaged state and the released state, respectively, in the forward/reverse switching device 24, the power transmitting path is established in the power transmission device 16 for driving the vehicle 10 in revere direction. With the reverse brake B1 and the forward clutch C1 being both placed in the released sates in the forward/reverse switching device 24, the power transmission device 16 is placed in its neutral state in which the transmission of the drive force is cut off.

The continuously variable transmission 28 includes an input-side pulley in the form of the primary pulley 50 connected to the input shaft 26, an output-side pulley in the form of the secondary pulley 52 connected to the output shaft 30, and a transmission element in the form of the transmission belt 54 wound or mounted on the two pulleys 50, 52. Each of the pulleys 50, 52 has a variable effective diameter. A power transmission is made owing to the friction force acting between the transmission belt 54 and the pulleys 50, 52 whereby the drive force of the engine 12 is transmitted toward the drive wheels 14.

The primary pulley 50 includes a fixed sheave 50a connected to the input shaft 26, a movable sheave 50b unrotatable about an axis of the input shaft 26 and axially movable relative to the fixed sheave 50a, and a hydraulic actuator 50c configured to apply a primary thrust Win (=primary pressure Pin*pressure receiving area) for changing a width of a V-shaped groove defined between the fixed and movable sheaves 50a, 50b of the primary pulley 50. The secondary pulley 52 includes a fixed sheave 52a connected to the output shaft 30, a movable sheave 52b unrotatable about an axis of the output shaft 30 and axially movable relative to the fixed sheave 52a, and a hydraulic actuator 52c configured to apply a secondary thrust Wout (=secondary pressure Pout*pressure receiving area) for changing a width of a V-shaped groove defined between the fixed and movable sheaves 52a, 52b of the secondary pulley 52. The primary pressure Pin is a hydraulic pressure supplied from the hydraulic control unit 40 to the hydraulic actuator 50c, while the secondary pressure Pout is a hydraulic pressure supplied from the hydraulic control unit 40 to the hydraulic actuator 52c. The primary and secondary hydraulic pressures Pin, Pout are pulley hydraulic pressures providing the respective primary and secondary thrusts Win, Wout by which the respective movable sheave 50b, 52b are forced toward the respective fixed sheave 50a, 52a.

In the continuously variable transmission 28, the primary and secondary pressures Pin, Pout are controlled by the hydraulic control unit 40 that is controlled by the electronic control device 80, whereby the primary and secondary thrusts Win, Wout are respectively controlled. With the primary and secondary thrusts Win, Wout being controlled, the widths of the V-shaped grooves of the respective pulleys 50, 52 are controlled to be changeable whereby a belt winding diameter (effective diameter) of each of the pulleys 50, 52 is changeable and accordingly a speed ratio γ(=input-shaft rotation speed Nin/output-shaft rotation speed Nout) of the variable transmission 28 is changeable. Further, with the primary and secondary thrusts Win, Wout being controlled, the belt clamping force by which the transmission belt 54 is clamped between the fixed and movable sheave 50a, 50b of the primary pulley 50 and between fixed and movable sheave 52a, 52b of the secondary pulley 52 is controlled, whereby the friction force acting between the transmission belt 54 and the pulleys 50, 52 is controlled such that the transmission belt 54 is not slipped on the pulleys 50, 52. That is, with the primary and secondary pressures Pin, Pout (primary and secondary thrusts Win, Wout) being controlled, an actual speed ratio γ of the continuously variable transmission 28 is set to the target speed ratio γtgt while the belt slippage (slipping of the transmission belt 54 on the pulleys 50, 52) being prevented. The friction force acting between the transmission belt 54 on the pulleys 50, 52 is based on the belt clamping force, and corresponds to a belt torque capacity Tcvt that is a torque capacity of the transmission belt 54 in the continuously variable transmission 28.

In the continuously variable transmission 28, a shift-up action is performed to reduce the speed ratio γ when the width of the V-shaped groove of the primary pulley 50 is reduced with increase of the primary pressure Pin, and a shift-down action is performed to increase the speed ratio γ when the width of the V-shaped groove of the primary pulley 50 is increased with reduction of the primary pressure Pin. In the continuously variable transmission 28, with the primary and second pressures Pin, Pout being controlled, the target speed ratio γtgt is established based on a relationship between the primary thrust Win and the secondary thrust Wout, while the belt slippage being prevented. Thus, the target speed ratio γtgt is not established by controlling only one of the primary and secondary pressures Pin, Pout (primary and secondary thrusts Win, Wout).

The vehicle 10 is provided with a transceiver 60. The transceiver 60 is a device configured to communicate with a site or center 100 that is a facility existing apart from the vehicle 10, so that the electronic control device 80 provided in the vehicle 10 transmits and receives various informations to and from the center 100 via the transceiver 60. The center 100 functions as a server, and is configured to receive, process, store and provide various informations. The center 100 transmits and receives various informations to and from other vehicles 110a, 110b, . . . (hereinafter referred to as "other vehicles 110"), as well as to and from the vehicle 10. Each of the other vehicles 110 has substantially the same construction as the vehicle 10 and basically has substantially the same functions as the vehicle 10. The center 100 and the other vehicles 110 can be considered as external devices that are located outside the vehicle 10. It can be considered that the electronic control device 80 of the vehicle 10 cooperates with the center 100 and electronic control devices (each of which functionally corresponds to the electronic control device 80) of the other vehicles 110 to constitute a vehicle control system in which the various informations are shared with one another.

The vehicle 10 is provided with the electronic control device 80 as a controller including the control apparatus constructed according to present invention. The electronic control device 80 is configured to control various devices of the vehicle 10 such as the engine 12 and the continuously variable transmission 28. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 is configured to perform an operation for controlling an output of the engine 12 and a shifting control operation for controlling, for example, the belt clamping force of the continuously variable transmission 28, and may be constituted by two or more control units exclusively assigned to perform different control operations such as an engine control operation and a hydraulic pressure control operation.

The electronic control device 80 receives various input signals based on values detected by respective sensors provided in the vehicle 10. Specifically, the electronic control device 80 receives: an output signal of an engine speed sensor 62 indicative of an engine speed Ne which is a rotation speed of the engine 12; an output signal of a turbine speed sensor 64 indicative of a turbine speed Nt which is a rotation speed of the turbine shaft 22; an input speed sensor 66 indicative of an input-shaft rotation speed Nin which is a rotation speed of the input shaft 26; an output signal of an output speed sensor 68 indicative of an output-shaft rotation speed Nout which is a rotation speed of the output shaft 30 and which corresponds to a running speed V of the vehicle 10; an output signal of an accelerator operation amount sensor 70 indicative of an operation amount θacc which represents an amount of accelerating operation made by a vehicle operator; an output signal of a throttle opening degree sensor 72 indicative of the throttle opening degree tap; an output signal of a shift position sensor 74 indicative of an operation position POSsh of a manually operated shifting member in the form of a shift lever 78 provided in the vehicle 10; and an output signal of a location sensor 76 including a GPS antenna and indicative of information Svp (hereinafter referred to as "location information Svp") relating to a position or location of the vehicle 10 on earth's surface or map, which is represented by a GPS signal or the like. Further, the electronic control device 80 generates various output signals which are supplied to various devices such as the engine control device 36 and the hydraulic control unit 40 and which include an engine control command signal Se for controlling the engine 12, a hydraulic control command signal Scvt for performing hydraulic controls such as controls of the shifting action and the belt clamping force, and a hydraulic control command signals Scb for performing hydraulic controls such as controls of operation states of the forward clutch C1 and the reverse brake B1.

The shift lever 78 is operable to be placed in a selected one of a plurality of operation positions POSsh that consist of, for example, a parking position P, a reverse position R, a neutral position N and a drive position D. With the shift lever 78 being placed in the parking position P, the power transmission device 16 is placed in its parking position in which the power transmission device 16 is placed in its neutral state and rotation of the output shaft 30 of the continuously variable transmission 28 is mechanically inhibited (locked). With the shift lever 78 being placed in the reverse position R, the power transmission device 16 is placed in its reverse drive position for establishing the power transmitting path enabling the vehicle 10 to run in a reverse direction. With the shift lever 78 being placed in the neutral position N, the power transmission device 16 is placed in its neutral position in which the power transmission device 16 is placed in its neutral state. With the shift lever 78 being placed in the drive position D, the power transmission device 16 is placed in its forward drive position for establishing the power transmitting path enabling the vehicle 10 to run in a forward direction.

The electronic control device 80 includes an engine control means or portion in the form of an engine control portion 82 and a transmission shifting control means or portion in the form of a transmission shifting control portion 84.

The engine control portion 82 controls the engine control device 36, so as to obtain a required engine torque Te. The engine control portion 82 calculates a required drive torque Tdem, for example, by applying the accelerator operation amount θacc and the running velocity V to a predetermined or stored relationship (e.g., drive force map) that is obtained by experimentation or determined by an appropriate design theory. The engine control portion 82 takes account of the speed ratio γ of the continuously variable transmission 28, and outputs the engine control command signal Se for controlling the engine 12 such that the engine torque Te providing the required drive torque Tdem is obtained.

The transmission shifting control portion 84 controls the speed ratio γ of the continuously variable transmission 28 and the belt torque capacity Tcvt (corresponding to the above-described friction force based on the belt clamping force) such that the target speed ratio γtgt of the continuously variable transmission 28 is established without the belt slippage occurring in the continuously variable transmission 28. Specifically described, the transmission shifting control portion 84 determines commanded hydraulic pressure values of the primary and second pressures Pin, Pout required for establishing the target speed ratio γtgt of the continuously variable transmission 28, which enables the engine 12 to be operated at an operating point lying on an optimum line (e.g., engine optimum-fuel-efficiency line), while avoiding occurrence of the belt slippage in the continuously variable transmission 28, by applying the acceleration operation amount θacc and the running speed V to a predetermined relationship such as a shifting map and a belt-clamping-force map (belt-torque-capacity map). Then, the transmission shifting control portion 84 supplies hydraulic control command signals Scvt representing the determined commanded hydraulic pressure values, to the hydraulic control unit 40.

There is a possibility that the belt slippage could occur in the continuously variable transmission 28 depending on the vehicle situation, even where the belt clamping force is controlled such that the belt slippage does not occur. It might be possible to memorize areas in which the belt slippage occurred in the continuously variable transmission 28, and to increase the pulley hydraulic pressure in the memorized areas before an actual occurrence of the belt slippage, such that the increased pulley hydraulic pressure is made higher than when the belt slippage occurred. However, there is a case where there is not stored any information relating to occurrence of the belt slippage in the continuously variable transmission 28 in an area, for example, where the vehicle has never run before in the same area. In such a case, it is not possible to carry out a control for increasing the belt clamping force before running in the same area. If the belt clamping force is increased always in such an area whose information relating to occurrence of the belt slippage in the continuously variable transmission 28 is not stored, there is a risk that durability of the belt could be reduced and/or fuel economy could be reduced.

In the present embodiment, informations relating to areas in which the belt slippage of the continuously variable transmission 28 has occurred in the vehicle 10 and the other vehicles 110 are collected, and a belt-slip information relating to at least one belt slippy area in which belt slippage of the continuously variable transmission 28 is more likely to occur is prepared based on the collected informations, so that a control for increasing the belt clamping force in the continuously variable transmission 28, based on the prepared belt-slip information, is executed. The belt-slip information relating to the at least one belt slippy area is, for example, a map predicting at least one area in which the belt slippage of the continuously variable transmission 28 could occur. The map is referred to as a hazard map MAPbelt of the belt slippage.

The electronic control device 80 further includes a vehicle-state determining means or portion in the form of a vehicle-state determining portion 86, an information processing means or portion in the form of an information processing portion 88 and clamping-force control means or portion (friction-force control means or portion) in the form of a clamping-force control portion 90, for performing various controls for suitably increasing the above-described friction force (belt clamping force).

The vehicle-state determining portion 86 determines whether the belt slippage of the continuously variable transmission 28 has occurred or not. This determination is made, for example, depending on whether a difference (=Nin−Ninsyc) between the input-shaft rotation speed Nin and a synchronized rotation speed Ninsyc (=γ×Nout) of the input shaft 26 (that is dependent on the output-shaft rotation speed Nout) has reached to at least a threshold difference, while the speed ratio γ of the continuously variable transmission 28 is controlled to be substantially constant. The threshold difference is, for example, an upper limit value, beyond which it is determined that the belt slippages is occurring.

When the vehicle-state determining portion 86 determines that the belt slippage of the continuously variable transmission 28 has occurred, the information processing portion 88 generates a control information Ic containing (i) a belt-slippage occurrence information representing that the belt slippage has occurred and (ii) a location information Svp representing a location of the vehicle 10 at a time when the belt slippage has occurred, such that the belt-slippage occurrence information is associated with the location information Svp. The information processing portion 88 transfers the generated control information Ic to the center 100 via the transceiver 60.

To the center 100, an information substantially the same as the above-described control information Ic is transferred from each one of the other vehicles 110, as the control information Ic is transferred from the vehicle 10. The center 100 sets at least one belt slippy area in which the belt slippage of the continuously variable transmission 28 is more likely to occur, based on the location information Svp contained in each of the control informations Ic transferred from the vehicles 10, 110. For example, the center 100 sets, as each of the at least one belt slippy area, an area with a certain range A surrounding a point indicated by the location information Svp contained in a corresponding one of the control informations IC. The certain range A is, for example, a predetermined range that is considered appropriate to be designated as the belt slippy area. The center 100 has the hazard map MAPbelt relating to the belt slippage. When adding new area or areas as the at least one belt slippy area, the center 100 updates the hazard map MAPbelt such that the new setting is reflected in the updated hazard map MAPbelt. Thus, the center 100 collects the control informations Ic in each of which the belt-slippage occurrence information and the location information Svp are associated with each other, and prepares the hazard map MAPbelt relating to the belt slippage.

After a power ON such as an ignition ON in the vehicle 10, the information processing portion 88 receives the hazard map MAPbelt relating to the belt slippage and stored in the center 100, from the center 100 via the transceiver 60, as needed.

The vehicle-state determining portion 86 obtains the location information Svp indicative of the current location of the vehicle 10, and determines whether the current location of the vehicle 10 corresponds to one of the at least one belt slippy area or not, with reference to the hazard map MAPbelt.

When the vehicle-state determining portion 86 determines that the current location of the vehicle 10 is within one of the above-described at least one belt slippy area, the clamping-force control portion 90 supplies, to the transmission shifting control portion 84, a command requesting execution of a hydraulic-pressure increasing control for making the pulley hydraulic pressure higher than normal by a certain pressure value Pf so as to increase the belt clamping force. The pulley hydraulic pressure in a normal case is, for example, a value determined based on the belt-clamping-force map by the transmission shifting control portion 84. The certain pressure value Pf is, for example, a predetermined minimum value, by which the pulley hydraulic pressure has to be increased so as to prevent occurrence of the belt slippage. On the other hand, when the vehicle-state determining portion 86 determines that the current location of the vehicle 10 is not within any one of the above-described at least one belt slippy area, the clamping-force control portion 90 inhibits execution of the above-described hydraulic-pressure increasing control. Thus, using the hazard map MAPbelt relating to the belt slippage received from the center 100, the clamping-force control portion 90 makes the belt clamping force of the continuously variable transmission 28 higher in the above-described at least one belt slippy area than in other areas in which the belt slippage is unlikely to occur.

There are various kinds of vehicle situations in which the belt slippage could occur. There is a case where the belt slippage occurs in one of the vehicle situations in an area and the belt slippage does not occur in another of the vehicle situations in the same area. In this case, it is preferable not to execute the hydraulic-pressure increasing control in the above-described another of the vehicle situations in the same area.

Specifically described, when the vehicle-state determining portion 86 determines that the belt slippage of the continuously variable transmission 28 has occurred, the information processing portion 88 obtains a kind of the vehicle situation (namely, a factor causing the belt slippage) when the belt slippage has actually occurred, and generates the control information Ic in which an information relating to the factor causing the belt slippage is associated with the other informations contained in the control information Ic. The belt slippage could be caused, for example, upon execution of a garage control in which the power transmission device 16 is placed from its neutral state to a state establishing the power transmitting path for a forward running (or a reverse running) by a garage shifting action by which the shift lever 78 is placed from the neutral position N (or parking position P) to the drive position D (or reverse position R). Further, the belt slippage could be caused, for example, upon starting or acceleration on an uphill road. Further, the belt slippage could be caused, for example, upon sudden reduction of rotation speed of the drive wheels 14 as a result of an abrupt braking operation made by a vehicle operator during running in a low friction-efficient road. Still further, the belt slippage could be caused, for example, upon sudden reduction of rotation speed of the drive wheels 14 after the vehicle has passed through a low friction-efficient road on which the drive wheels 14 had been slipped. Moreover, the belt slippage could be caused, for example, upon sudden reduction of rotation speed of the drive wheels 14 as a result of grip of the drive wheels 14 with a road surface after slip of the drive wheels 14 on the road surface during running of the vehicle on a poor conditioned road such as a wavelike road. Thus, as the factors (hereinafter referred to as "belt-slippage causing factors"), for example, there are an execution of the garage control, a stop of the vehicle on an uphill road, a running of the vehicle on an uphill road, a running of the vehicle on a low friction-efficient road and a running of the vehicle on a poor conditioned road.

The center 100 determines the above-described at least one belt slippy area such that each of the at least one belt slippy area is associated with a corresponding one or ones of the belt-slippage causing factors, based on the location information Svp contained in each control information Ic. Thus, in the hazard map MAPbelt relating to the belt slippage, each of the at least one belt slippy area is associated with the corresponding belt-slippage causing factor or factors.

When the vehicle 10 is in one of the at least one belt slippy area, the vehicle-state determining portion 86 determines whether or not the current vehicle situation corresponds to a corresponding one of the belt-slippage causing factors, which is a factor having actually caused the belt slippage in the above-described one of the at least one belt slippy area in the past, with reference to the hazard map MAPbelt in which each of the at least one belt slippy area is associated with a corresponding one of the belt-slippage causing factors. In this determination, an affirmative determination may be made not only when the current vehicle situation is completely coincident with the corresponding belt-slippage causing factor but also when the current vehicle situation is regarded to be similar with the corresponding belt-slippage causing factor.

When the vehicle-state determining portion 86 determines that the current location of the vehicle 10 is within one of the at least one belt slippy area and also that the current vehicle situation corresponds to the corresponding belt-slippage causing factor, the clamping-force control portion 90 supplies, to the transmission shifting control portion 84, a command requesting execution of the hydraulic-pressure increasing control. On the other hand, when the vehicle-state determining portion 86 determines that the current location of the vehicle 10 is not within any one of the at least one belt slippy area, or when the vehicle-state determining portion 86 determines that the current vehicle situation does not correspond to the corresponding belt-slippage causing factor (even if determining that the current location of the vehicle 10 is within one of the at least one belt slippy area), the clamping-force control portion 90 inhibits execution of the hydraulic-pressure increasing control. Thus, the clamping-force control portion 90 increases the belt clamping force of the continuously variable transmission 28 in a case where that the current vehicle situation is the same or is regarded to be same as the vehicle situation in which the belt slippage has occurred, based on a comparison between the current vehicle situation of the vehicle 10 and the vehicle situation (represented in the hazard map MAPbelt) in which the belt slippage has occurred. When the current vehicle situation corresponds to the corresponding belt-slippage causing factor, there is a case where the pulley hydraulic pressure is controlled to be higher than a value originally determined by the transmission shifting control portion 84 based on belt-clamping-force map, by a predetermined value. In this case, if the belt slippage occurs even with the pulley hydraulic pressure being increased by the predetermined value, the hazard map MAPbelt is set with association with the belt-slippage causing factor upon occurrence of the belt slippage. Therefore, in this case, the normal pulley hydraulic pressure is the pulley hydraulic pressure increased by the predetermined value, so that the hydraulic-pressure increasing control is executed by still increasing the pulley hydraulic pressure (already increased by the predetermined value) by the certain pressure value Pf.

Figure 2:
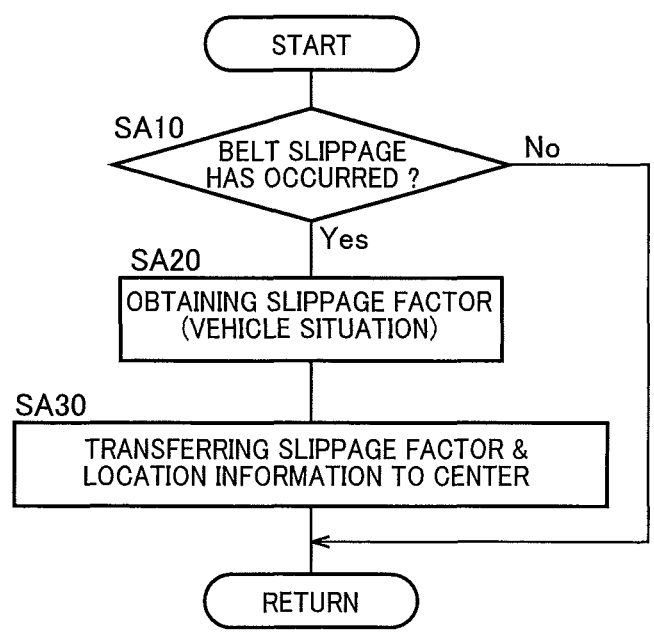
FIG. 2 is a flow chart showing a part of control routine that is executed by an electronic control device, so as to appropriately restrain or prevent a belt slippage in a continuously variable transmission of the vehicle, as needed, before the belt slippage actually occurs.
Figure 3:
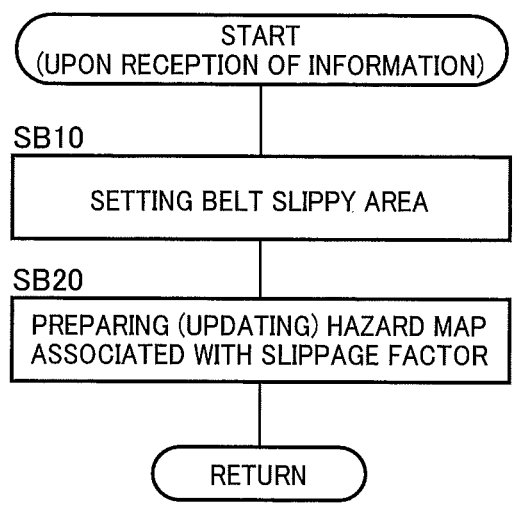
FIG. 3 is a flow chart showing a part of control routine that is executed by a center, so as to appropriately restrain or prevent the belt slippage in the continuously variable transmission, as needed, before the belt slippage actually occurs.
Figure 4:
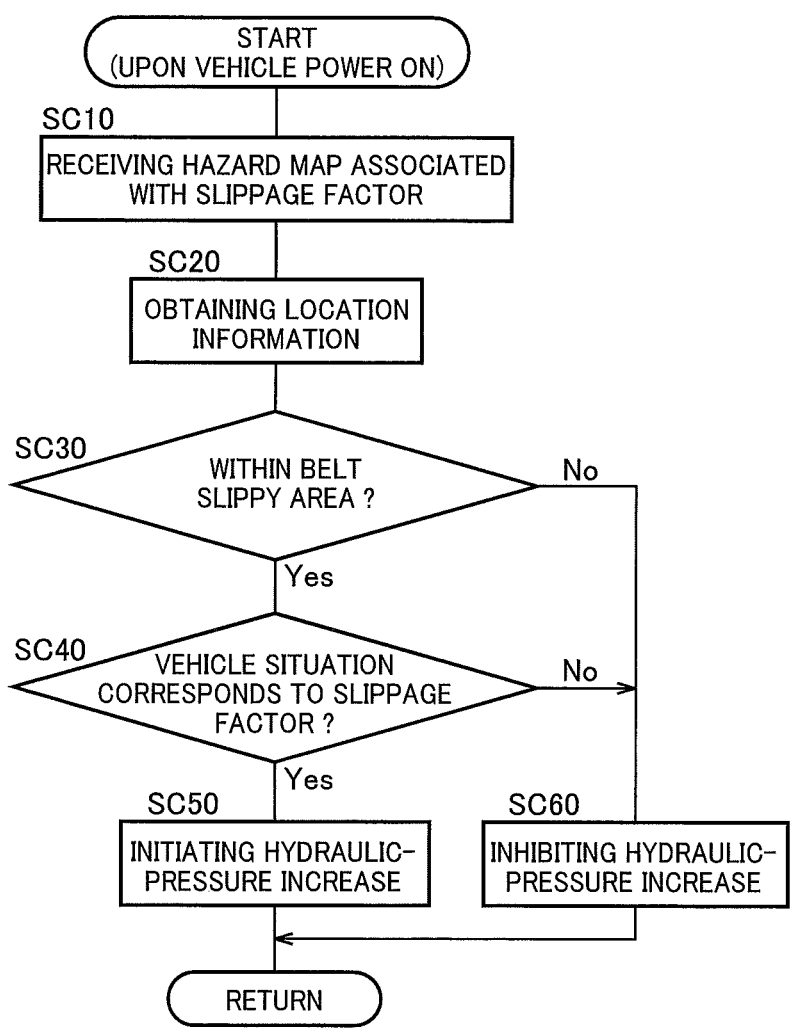
FIG. 4 is a flow chart showing a part of control routine that is executed by the electronic control device, so as to appropriately restrain or prevent the belt slippage in the continuously variable transmission, as needed, before the belt slippage actually occurs.

Each of FIGS. 2-4 is a flow chart showing a control routine that is executed to appropriately restrain or prevent the belt slippage in the continuously variable transmission 28, as needed, before the belt slippage actually occurs. The control routines of FIGS. 2 and 4 are executed in the electronic control device 80. The control routine of FIG. 3 is executed in the center 100.

The control routine of FIG. 2 is initiated with step SA10 (hereinafter simply referred to as "SA10" as well as the other steps) corresponding to the function of the vehicle-state determining portion 86, to determine whether the belt slippage of the continuously variable transmission 28 has occurred or not. If a negative determination is made at the SA10, one cycle of execution of the control routine is terminated. If an affirmative determination is made at the SA10, the control flow goes to SA20 corresponding to the function of the information processing portion 88, to obtain the vehicle situation (i.e., factor causing the belt slippage) upon occurrence of the belt slippage. Then, SA30 corresponding to the function of the information processing portion 88 is implemented to generate the control information Ic containing (i) the belt-slippage occurrence information representing that the belt slippage has occurred, (ii) the location information Svp representing a location of the vehicle 10 at a time when the belt slippage has occurred and (iii) a belt-slippage factor information representing a factor that caused the belt slippage, wherein the belt-slippage occurrence information, location information Svp and the belt-slippage factor information are associated with one another, so that the generated control information Ic is transferred to the center 100 through the transceiver 60.

The control routine of FIG. 3 is initiated with SB10 corresponding to the function of a belt-slippy-area setting portion. The SB10 is implemented upon reception of the control information Ic by the center 100, to set the at least one belt slippy area. Each of the at least one belt slippy area is associated with the factor causing the belt slippage of the continuously variable transmission 28, and is set based on the location information Svp and the belt-slippage factor information that are contained in the corresponding control information Ic. Then, SB20 corresponding to the function of a map updating portion, is implemented to update the hazard map MAPbelt of the belt slippage associated with the factor causing the belt slippage, such that the setting of the at least one belt slippy area made at the SB10 is reflected in the updated hazard map MAPbelt.

The control routine of FIG. 4 is initiated with SC10 corresponding to the function of the information processing portion 88. The SC10 is implemented after power-ON of the vehicle 10, to receive the hazard map MAPbelt associated with the factor causing the belt slippage, from the center 100 via the transceiver 60. The SC10 is followed by SC20 corresponding to the vehicle-state determining portion 86, to obtain the location information Svp indicative of the current location of the vehicle 10. Then, SC30 corresponding to the vehicle-state determining portion 86 is implemented to determine whether the current location of the vehicle 10 is within one of the at least one belt slippy area relating to the continuously variable transmission 28, using the hazard map MAPbelt. If an affirmative determination is made at the SC30, SC40 corresponding to the function of the vehicle-state determining portion 86 is implemented to determine whether the current vehicle situation corresponds to the factor causing the belt slippage in the above-described one of the at least one belt slippy area (within which the current location of the vehicle 10 has been determined to be at the SC30). If an affirmative determination is made at the SC40, SC50 corresponding to the functions of the clamping-force control portion 90 and the transmission shifting control portion 84 is implemented to initiate the above-described hydraulic-pressure increasing control. If a negative determination is made at the SC30 or at the SC40, the control flow goes to SC60 corresponding to the clamping-force control portion 90, to inhibit the hydraulic-pressure increasing control.

As described above, in the present embodiment, the belt clamping force (i.e., friction force) in the continuously variable transmission 28 is controlled based on the belt-slip information (i.e., hazard map MAPbelt) received from the center 100, such that the belt clamping force is larger in the at least one belt slippy area than in the other areas in which the belt slippage is less likely to occur. Thus, even in an area where the vehicle 10 runs for the first time, it is possible to control the vehicle 10 so as to restrain or prevent the belt slippage without necessarily increasing the belt clamping force in the same manner. Therefore, the belt slippage in the continuously variable transmission 28 can be appropriately restrained or prevented, as needed, before the belt slippage actually occurs.

In the present embodiment, the belt clamping force (i.e., friction force) in the continuously variable transmission 28 is increased based on a comparison between the actual situation of the vehicle 10 and the vehicle situation associated with the belt-slip information, whereby the vehicle 10 is controlled to restrain or prevent the belt slippage, depending the actual situation of the vehicle 10, so that it is possible to further restrain reduction of the durability of the transmission belt 54 and/or reduction of the fuel economy, which could be caused by increase of the belt clamping force (i.e., friction force) in the continuously variable transmission 28.

In the present embodiment, the center 100 generates the belt-slip information by collecting the belt-slippage occurrence informations each of which relates to occurrence of the belt slippage and each of which is associated with the location information Svp, so that, even in an area where the vehicle 10 runs for the first time, it is possible to control the vehicle 10 so as to restrain or prevent the belt slippage without necessarily increasing the belt clamping force (i.e., friction force) in the continuously variable transmission 28 in the same manner.

There will be described other embodiments of this invention. The same reference signs as used in the above-described first embodiment will be used in the following embodiments, to identify the functionally corresponding elements.

Second Embodiment

In the above-described first embodiment, when the vehicle 10 is located in the at least one belt slippy area represented in the hazard map MAPbelt of the belt slippage, the hydraulic-pressure increasing control is executed. However, the belt slippage could be caused even when the hydraulic-pressure increasing control is executed. In this case, it is preferable to further increase the pulley hydraulic pressure. Further, since an increase of the pulley hydraulic pressure could reduce durability of the belt and/or reduce fuel economy, it is preferable to reduce the pulley hydraulic pressure as long as the increase of the pulley hydraulic pressure is not required. In the present second embodiment, the certain pressure value Pf, by which the pulley hydraulic pressure is increased upon execution of the hydraulic-pressure increasing control, is changed, is changed depending on frequency of occurrence of the belt slippage. When the hydraulic-pressure increasing control is not executed, a pressure increase level is indicated as "level 0" in the hazard map MAPbelt. When the certain pressure value Pf is a first certain pressure value Pfa, the pressure increase level is indicated as "level 1" in the hazard map MAPbelt. When the certain pressure value Pf is a second certain pressure value Pfb, the pressure increase level is indicated as "level 2" in the hazard map MAPbelt. When the certain pressure value Pf is a maximum certain pressure value Pfmax, the pressure increase level is indicated as "level MAX" (Pfa<Pfb<Pfmax) in the hazard map MAPbelt. In the present second embodiment, the pressure increase level is represented as well as the belt slippy area and the belt-slippage causing factor in the hazard map MAPbelt.

Specifically described, when the vehicle-state determining portion 86 determines that the belt slippage of the continuously variable transmission 28 has occurred, the information processing portion 88 generates the control information Ic containing, in addition to the above-described belt-slippage occurrence information, location information Svp and belt-slippage factor information, a pressure-increase-level increasing request information representing a request to increase the pressure increase level that is represented in the hazard map MAPbelt, such that the pressure-increase-level increasing request information is associated with the belt-slippage occurrence information, location information Svp and belt-slippage factor information in the generated control information Ic.

The center 100 sets the pressure increase level in accordance with the pressure-increase-level increasing request information contained in the control information Ic. For example, when receiving the control information Ic containing the pressure-increase-level increasing request information, the center 100 determines whether the pressure increase level is indicated as the "level MAX" in the hazard map MAPbelt relating to the belt slippage. If the center 100 determines that the pressure increase level is not indicated as the "level MAX" in the hazard map MAPbelt, the center 100 updates the pressure increase level represented in the hazard map MAPbelt such that the updated pressure increase level is increased by one level. If the center 100 determines that the pressure increase level is indicated as the "level MAX" in the hazard map MAPbelt, the center 100 does not increase the pressure increase level represented in the hazard map MAPbelt.

The center 100 periodically obtains the pressure increase level represented in the hazard map MAPbelt stored in the center 100, and determines whether the pressure increase level has not been increased by the pressure-increase-level increasing request within at least a given period of time in the update record. The given period of time is a predetermined threshold value for making it possible to determine that, in a case where the pressure increase level has not been changed within at least the given period of time, the pressure-increase-level increasing request has been absent for a time long enough to permit the pressure increase level to be reduced. Further, the center 100 determines whether the pressure increase level has been repeatedly increased and reduced in the update history. For example, where the pressure increase level has been changed from "level 1" to "level 2" and then from "level 2" to "level 1" and then "level 1" to "level 2" in the update history, it is determined that the pressure increase level has been repeatedly increased and reduced in the update history. When determining that the pressure increase level has not been increased by the pressure-increase-level increasing request within at least the given period of time in the update record and also that the pressure increase level has not been repeatedly increased and reduced in the update history, the center 100 executes a pressure-increase level down, by which the pressure increase level represented in the hazard map MAPbelt is reduced by one level. On the other hand, when determining that the pressure increase level has been increased by the pressure-increase-level increasing request within the given period of time in the update record or when determining that the pressure increase level has been repeatedly increased and reduced in the update history, the center 100 holds the pressure increase level represented in the hazard map MAPbelt, without executing the pressure-increase level down. Thus, the hazard map MAPbelt relating to the belt slippage is information associated with the frequency of occurrence of the belt slippage. Further, the clamping-force control portion 90 executes the above-described hydraulic-pressure increasing control by using this hazard map MAPbelt, so that the belt clamping force is changed based on this hazard map MAPbelt.

Figure 5:
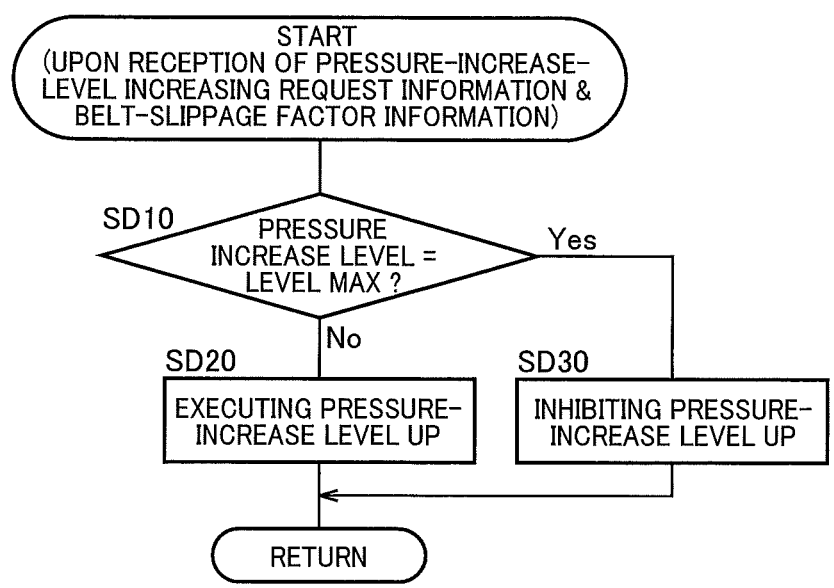
FIG. 5 is a flow chart showing a part of control routine that is executed by the center, so as to appropriately restrain or prevent the belt slippage in the continuously variable transmission, as needed, before the belt slippage actually occurs.
Figure 6:
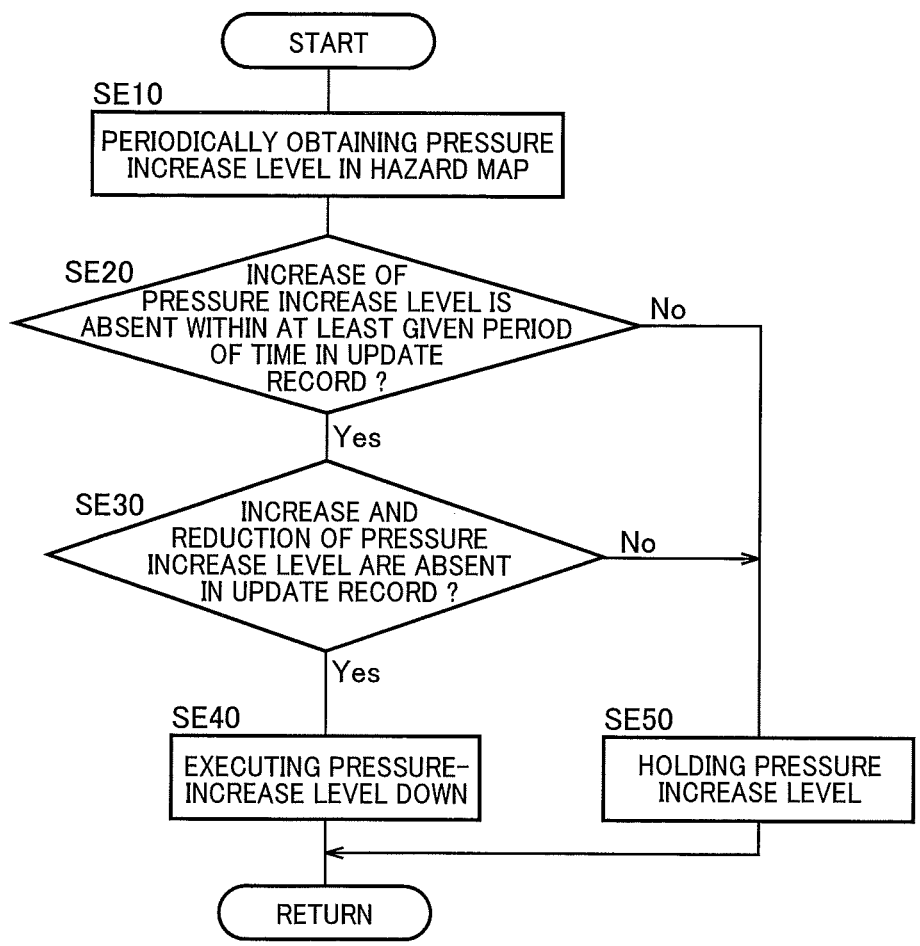
FIG. 6 is a flow chart showing a part of control routine that is executed by the center, so as to appropriately restrain or prevent the belt slippage in the continuously variable transmission, as needed, before the belt slippage actually occurs.

Each of FIGS. 5 and 6 is a flow chart showing a control routine that is executed by the center 100, to appropriately restrain or prevent the belt slippage in the continuously variable transmission 28, as needed, before the belt slippage actually occurs.

The control routine of FIG. 5 is initiated with SD10 corresponding to the function of a setting level determining portion. The SD10 is implemented, upon reception of the control information Ic including the pressure-increase-level increasing request information in addition to the belt-slippage occurrence information, location information Svp and belt-slippage factor information, to determine whether the pressure increase level is indicated as the "level MAX" in the hazard map MAPbelt relating to the belt slippage. If a negative determination is made at the SD10, SD20 corresponding to a pressure-increase-level setting portion is implemented to execute a pressure-increase level up for increasing the pressure increase level represented by the hazard map MAPbelt, by one level. If a positive determination is made at the SD10, SD30 corresponding to the pressure-increase-level setting portion is implemented to inhibit the pressure-increase level up.

The control routine of FIG. 6 is initiated with SE10 corresponding to the function of a pressure-increase-level obtaining portion, which is implemented to periodically obtain the pressure increase level represented in the hazard map MAPbelt stored in the center 100. Then, SE20 corresponding to the function of an update-record determining portion is implemented to determine whether an increase of the pressure increase level has been absent within at least the given period of time in the update record. If an affirmative determination is made at the SE20, the control flow goes to SE30 corresponding to the function of an up-down-record determining portion, to determine whether repeated increase and reduction of the pressure increase level haven been absent in the update record. If an affirmative determination is made at the SE30, the control flow goes to SE40 corresponding to the function of the pressure-increase-level setting portion, to execute the pressure-increase level down, by which the pressure increase level represented in the hazard map MAPbelt is reduced by one level. If a negative determination is made at the SE20 or at the SE30, the control flow goes to SE50 corresponding to the pressure-increase-level setting portion, to hold the pressure increase level represented in the hazard map MAPbelt, without executing the pressure-increase level down.

As described above, in the present second embodiment, the belt clamping force (i.e., friction force) is changed based on the hazard map MAPbelt associated with the frequency at which the belt slippage has occurred, so that the control of the belt clamping force for retraining or preventing the belt slippage can be made appropriately. Further, the belt clamping force is not required to be increased depending on frequency of occurrence of the belt slippage so that it is possible to further restrain reduction of the durability of the transmission belt 54 and/or reduction of the fuel economy, which could be caused by increase of the belt clamping force.

Third Embodiment

In the above-described first and second embodiments, the belt clamping force is controlled to be increased, with reference to the hazard map MAPbelt that is received from the center 100. However, there could be a case where the vehicle 10 cannot receive the hazard map MAPbelt from the center 100, for some reason. In this case, the belt clamping force could not be controlled to be increased. In the present third embodiment, when being unable to receive the hazard map MAPbelt from the center 100, the vehicle 10 receives, from one of the other vehicles 110, a hazard map MAPbelt that is substantially the same as the hazard map MAPbelt owned by the center 100. In this sense, each of the other vehicles 110 as well as the center 100 is considered to correspond to the external device that is located outside the vehicle 10. Further, the transceiver 60 is considered to be a device configured to communicate the other vehicles 110 as well as to the center 100. Thus, the electronic control device 80 transmits and receives various informations (particularly, hazard map MAPbelt) to and from the other vehicles 110 via the transceiver 60. The communication made between the vehicle 10 and the other vehicle 110 will be referred to as "vehicle-to-vehicle communication".

Further, there could be a case where the vehicle 10 cannot receive the hazard map MAPbelt from the center 100, and one or ones of the other vehicles 110, which can make the vehicle-to-vehicle communication with the vehicle 10, do not have the hazard map MAPbelt. In this case, if the one or ones of the other vehicles 110 have a pressure-up execution flag indicating that the hydraulic-pressure increasing control has been executed in the same vehicle or vehicles in an area close to or same as the area in which the vehicle 10 is currently located, the hydraulic-pressure increasing control is executed based on the pressure-up execution flag in the vehicle 10.

Described specifically, the information processing portion 88 requests the center 100 to provide the hazard map MAPbelt, and determines whether the hazard map MAPbelt can be received from the center 100. When determining that the hazard map MAPbelt can be received from the center 100, the information processing portion 88 receives the hazard map MAPbelt owned by the center 100, from the center 100 via the transceiver 60. When determining that the hazard map MAPbelt cannot be received from the center 100, the information processing portion 88 determines whether at least one of the other vehicles 110 is located within a certain range B from the current location of the vehicle 10. The certain range B is a predetermined range that permits to consider that the vehicle 10 can use informations owned by another vehicle as long as the another vehicle is located within the certain range B. When determining that at least one of the other vehicles 110 is located within the certain range B, the information processing portion 88 determines whether the at least one of the other vehicles 110 owns the hazard map MAPbelt relating to the belt slippage. When determining that the at least one of the other vehicles 110 owns the hazard map MAPbelt, the information processing portion 88 receives the hazard map MAPbelt from one of the at least one of the other vehicles 110 via the transceiver 60. When determining that the at least one of the other vehicles 110 does not own the hazard map MAPbelt, the information processing portion 88 determines whether the at least one of the other vehicles 110 owns the pressure-up execution flag. When determining that the at least one of the other vehicles 110 owns the pressure-up execution flag, the information processing portion 88 receives the pressure-up execution flag from one of the at least one of the other vehicles 110 via the transceiver 60, and then executes the hydraulic-pressure increasing control in accordance with the pressure-up execution flag. The pressure-up execution flag represents that the belt clamping force of the continuously variable transmission has been increased in the other vehicle 100, and may contain an information indicative of the pressure increase level. Thus, when the hazard map MAPbelt cannot be received from the center 100 and the other vehicles 100 do not have the hazard map MAPbelt, the clamping-force control portion 90 increases the belt clamping force in accordance with the pressure-up execution flag received from one of the other vehicles 100.

Figure 7:
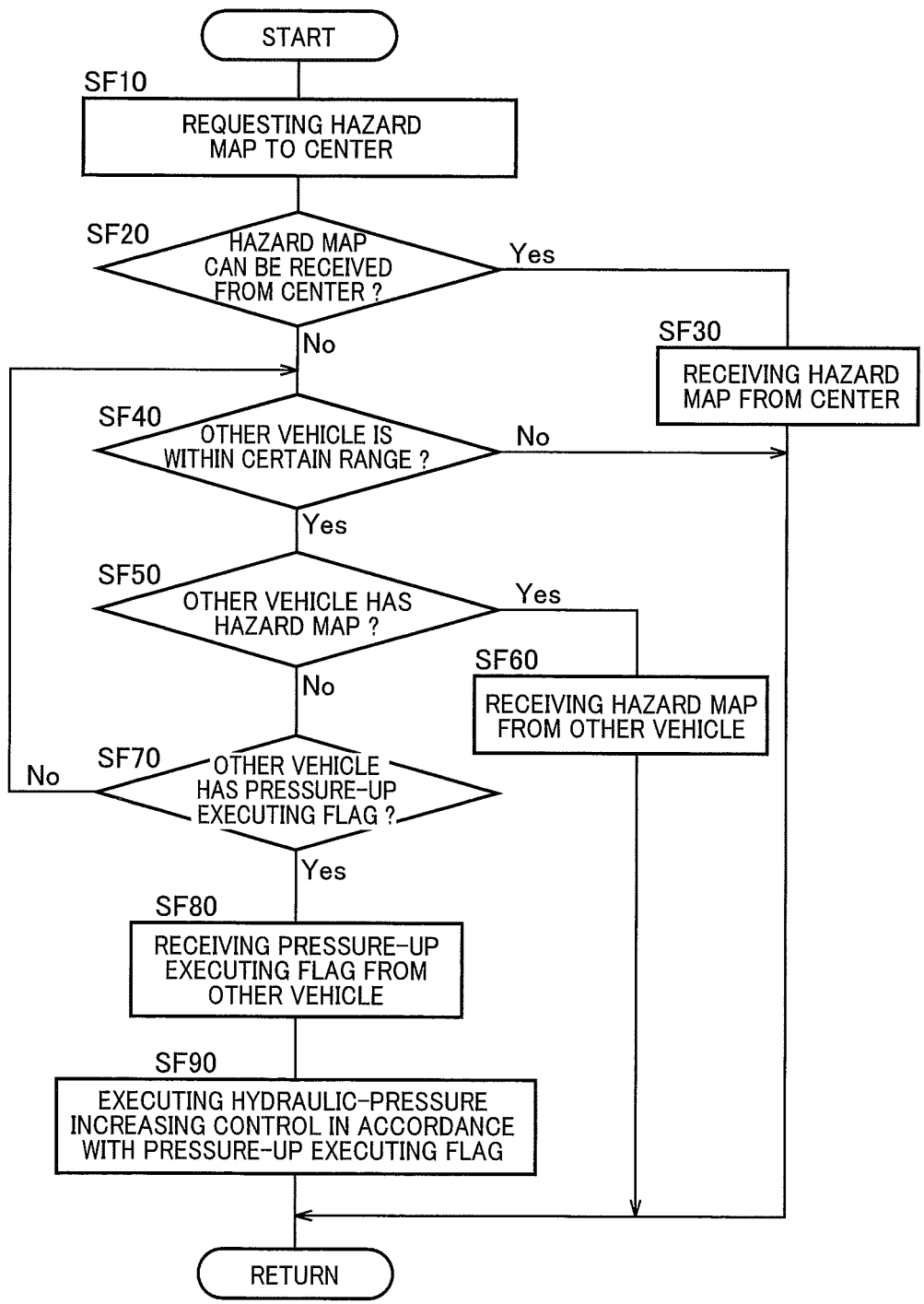
FIG. 7 is a flow chart showing a part of control routine that is executed by the electronic control device, so as to appropriately restrain or prevent the belt slippage in the continuously variable transmission, as needed, before the belt slippage actually occurs.

FIG. 7 is a flow chart showing a control routine that is executed by the electronic control device 80, to appropriately restrain or prevent the belt slippage in the continuously variable transmission 28, as needed, before the belt slippage actually occurs.

The control routine of FIG. 7 is initiated with SF10 corresponding to the function of the information processing portion 88. The SF10 is implemented to request the center 100 to provide the hazard map MAPbelt relating to the belt slippage. Then, SF20 corresponding to the function of the information processing portion 88 is implemented to determine whether the hazard map MAPbelt can be received from the center 100. If an affirmative determination is made at the SF20, the control flow goes to SF30 corresponding to the function of the information processing portion 88, to receive the hazard map MAPbelt from the center 100. If a negative determination is made at the SF20, the control flow goes to SF40 corresponding to the function of the information processing portion 88, to determine whether at least one of the other vehicles 110 is located within the certain range B. If a negative determination is made at the SF40, one cycle of execution of the control routine is terminated. If an affirmative determination is made at the SF40, the control flow goes to SF50 corresponding to the function of the information processing portion 88, to determine whether the at least one of the other vehicles 110 owns the hazard map MAPbelt. If an affirmative determination is made at the SF50, the control flow goes to SF60 corresponding to the function of the information processing portion 88, to receive the hazard map MAPbelt from one of the least one of the other vehicles 110. If a negative determination is made at the SF50, the control flow goes to SF70 corresponding to the function of the information processing portion 88, to determine whether the at least one of the other vehicles 110 owns the pressure-up execution flag. If a negative determination is made at the SF70, the control flow goes back to the SF40. If an affirmative determination is made at the SF70, the control flow goes to SF80 corresponding to the function of the information processing portion 88, to receive the pressure-up execution flag from one of the one of the at least one of the other vehicles 110. The SF80 is followed by SF90 corresponding to the function of the clamping-force control portion 90, to execute the hydraulic-pressure increasing control in accordance with the pressure-up execution flag.

As described above, in the present third embodiment, when the hazard map MAPbelt cannot be received from the center 100, the hazard map MAPbelt is received from the other vehicle or vehicles 110, so that it is possible to control the vehicle 10 for retraining or preventing the belt slippage by using the hazard map MAPbelt even in a case where the vehicle 10 cannot communicate with the center 100.

In the present third embodiment, when the electronic control device 80 is unable to receive the hazard map MAPbelt from the center 100 and the other vehicles 110 do not have the hazard map MAPbelt, the belt clamping force (i.e., friction force) in the continuously variable transmission 28 of the vehicle 10 is increased based on a pressure-increase information in the form of the pressure-up execution flag received from the other vehicle or vehicles 110 and representing that the belt clamping force in the other vehicle or vehicles 110 was increased. Thus, even where the hazard map MAPbelt is not available, it is possible to control 10 for restraining or preventing the belt slippage.

Fourth Embodiment

In the above-described first through third embodiments, the hydraulic-pressure increasing control is executed in the at least one belt slippy area (that is referred also to as "hazard area") represented in the hazard map MAPbelt. When the vehicle 10 is located close to a boundary between the hazard area and a non-hazard area, a hunting causing the hydraulic-pressure increasing control to be repeatedly executed and cancelled at a short cycle could occur. Such a hunting could occur also where the hydraulic-pressure increasing control is executed in accordance with the pressure-up execution flag owned by the other vehicle 110 as in the above-described third embodiment.

In the present fourth embodiment, in a case where the vehicle 10 has been out of one of the hazard areas and a distance from the vehicle 10 to a next one of the hazard areas which the vehicle is likely to enter next, is shorter than a threshold distance, the clamping-force control portion 90 keeps the belt clamping force high. Further, in a case where the hazard map MAPbelt could not be received and the belt clamping force was increased in accordance with the pressure-up execution flag received from the other vehicle 110, the clamping-force control portion 90 keeps the belt clamping force high until a distance from the vehicle 10 to the other vehicle 100 becomes at least the threshold distance. The threshold distance is a lower limit value that is predetermined, for example, for preventing occurrence of the hunting in the hydraulic-pressure increasing control.

There will be described a specific example where the hazard map MAPbelt of the center 100 is used. The vehicle-state determining portion 86 determines whether the vehicle 10 has been out of the hazard area during execution of the hydraulic-pressure increasing control. When determining that the vehicle 10 has been out the hazard area, the vehicle-state determining portion 86 determines whether the distance to the next hazard area is at least the threshold distance. When the vehicle-state determining portion 86 determines that the distance to the next hazard area is shorter than the threshold distance, the clamping-force control portion 90 continues the hydraulic-pressure increasing control. When the vehicle-state determining portion 86 determines that the distance to the next hazard area is at least the threshold distance, the clamping-force control portion 90 cancels the hydraulic-pressure increasing control. It is noted that the above-described next hazard area is interpreted to mean not only another hazard area which the vehicle 20 is predicted to enter next but also the hazard area which the vehicle 20 has been out of shortly before.

There will be described a specific example where the vehicle-to-vehicle communication can be used. The vehicle-state determining portion 86 determines whether the vehicle-to-vehicle communication is being used during execution of the hydraulic-pressure increasing control. If the vehicle-to-vehicle communication is not being used, the hydraulic-pressure increasing control is executed with use of the hazard map MAPbelt of the center 100. Therefore, when the vehicle-state determining portion 86 determines that the vehicle-to-vehicle communication is not being used, a control routine is executed substantially in the same manner as the above-described example where the hazard map MAPbelt of the center 100 is used. When determining that the vehicle-to-vehicle communication is being used, the vehicle-state determining portion 86 determines whether the hazard map MAPbelt is being used. If the hazard map MAPbelt is being used, the hydraulic-pressure increasing control is executed with use of the hazard map MAPbelt of the other vehicle 110. Therefore, when the vehicle-state determining portion 86 determines that the hazard map MAPbelt is being used, a control routine is carried out in the same manner as the above-described example where the hazard map MAPbelt of the center 100 is used. On the other hand, if the hazard map MAPbelt is not being used, the hydraulic-pressure increasing control is executed with use of the pressure-up execution flag of the other vehicle 110. Therefore, when determining that the hazard map MAPbelt is not being used, the vehicle-state determining portion 86 determines whether the distance from the other vehicle 110, with which the vehicle 10 is in communication by the vehicle-to-vehicle communication, has become at least the threshold distance. When the vehicle-state determining portion 86 determines that the distance from the other vehicle 110, with which the vehicle 10 is in communication, is still shorter than the threshold distance, the clamping-force control portion 90 continues the hydraulic-pressure increasing control. When the vehicle-state determining portion 86 determines that the distance from the other vehicle 110, with which the vehicle 10 is in communication, has become at least the threshold distance, the clamping-force control portion 90 cancels the hydraulic-pressure increasing control.

Figure 8:
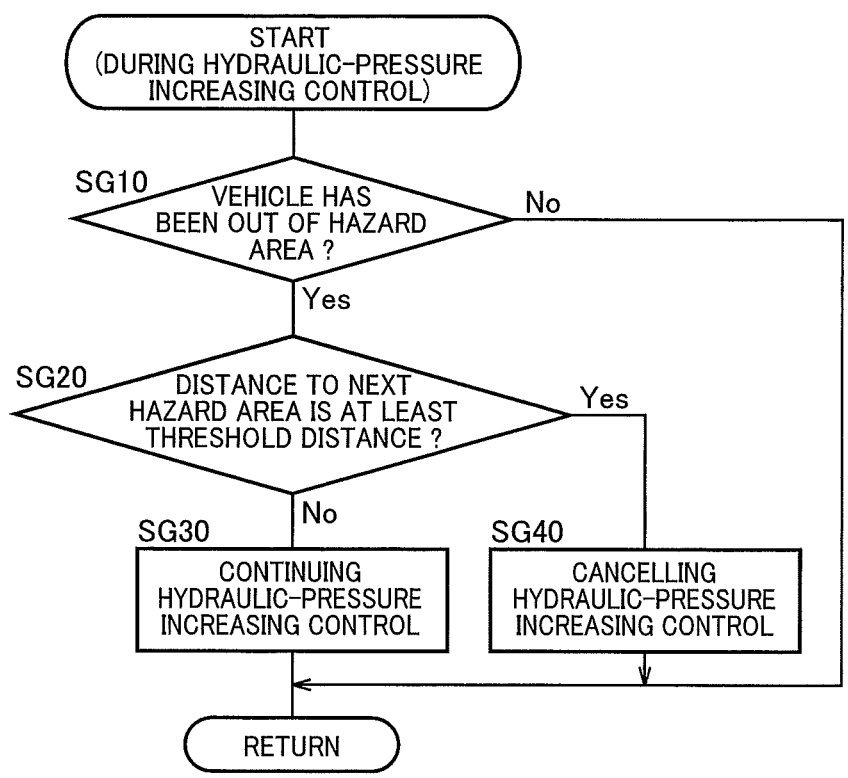
FIG. 8 is a flow chart showing a part of control routine that is executed by the electronic control device, so as to appropriately restrain or prevent the belt slippage in the continuously variable transmission, as needed, before the belt slippage actually occurs.
Figure 9:
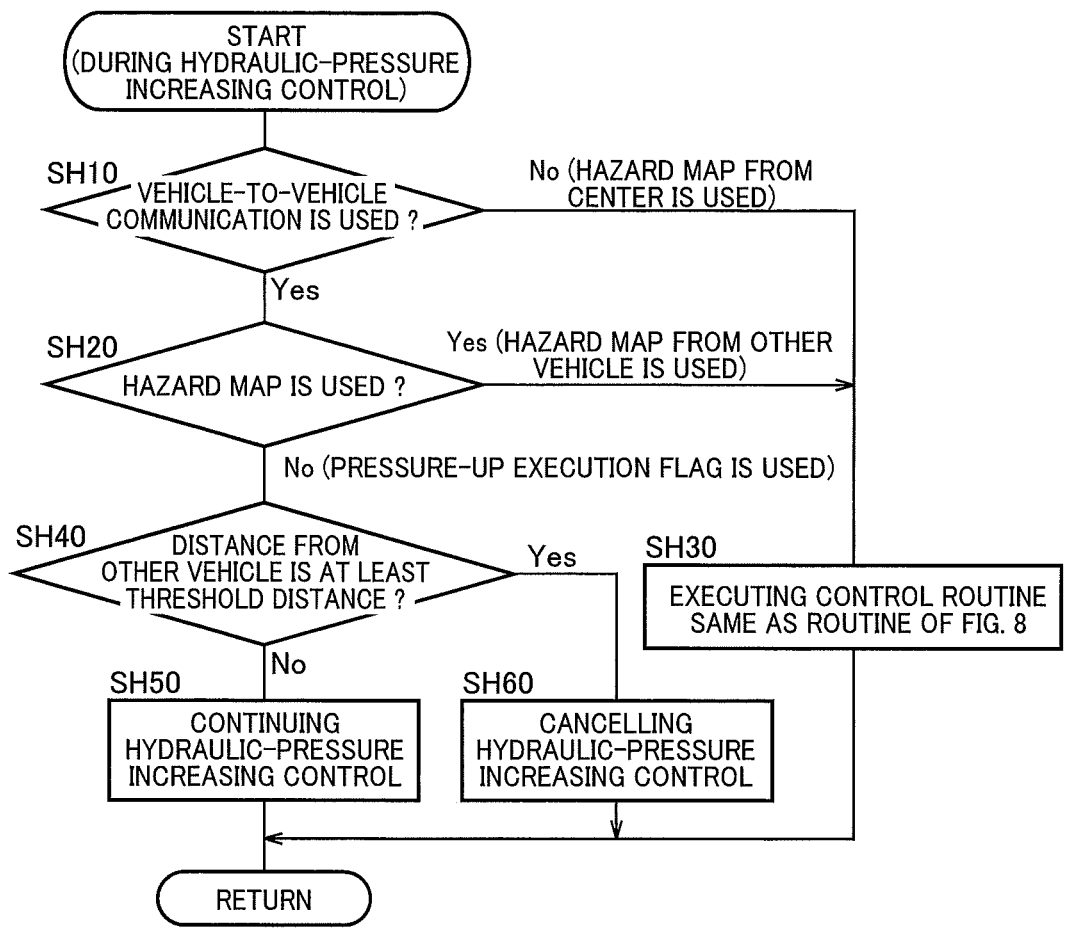
FIG. 9 is a flow chart showing a part of control routine that is executed by the electronic control device, so as to appropriately restrain or prevent the belt slippage in the continuously variable transmission, as needed, before the belt slippage actually occurs.

Each of FIGS. 8 and 9 is a flow chart showing a control routine that is executed by the electronic control device 80, to appropriately restrain or prevent the belt slippage in the continuously variable transmission 28, as needed, before the belt slippage actually occurs. The flow chart of FIG. 8 is for explaining the example where the hazard map MAPbelt of the center 100 is used. The flow chart of FIG. 9 is for explaining the example where the vehicle-to-vehicle communication can be used.

The control routine of FIG. 8 is initiated with SG10 corresponding to the function of the vehicle-state determining portion 86. The SG10 is implemented, during execution of the hydraulic-pressure increasing control, to determine whether the vehicle 10 has been out of the hazard area. If a negative determination is made at the SG10, one cycle of execution of the control routine is terminated. If an affirmative determination is made at the SG10, SG20 corresponding to the function of the vehicle-state determining portion 86 is implemented to determine whether the distance to the next hazard area is at least the threshold distance. If a negative determination is made at the SG20, SG30 corresponding to the function of the clamping-force control portion 90 is implemented to continue the hydraulic-pressure increasing control. If an affirmative determination is made at the SG20, SG40 corresponding to the clamping-force control portion 90 is implemented to cancel the hydraulic-pressure increasing control.

The control routine of FIG. 9 is initiated with SH10 corresponding to the function of the vehicle-state determining portion 86. The SH10 is implemented, during execution of the hydraulic-pressure increasing control, to determine whether the vehicle-to-vehicle communication is being used. If an affirmative determination is made at the SH10, SH20 corresponding to the function of the vehicle-state determining portion 86 is implemented to determine whether the hazard map MAPbelt is being used. If a negative determination is made at the SH10 or if an affirmative determination is made at the SH20, the control flow goes to SH30 that is implemented to execute a control routine that is substantially the same as the control routine of FIG. 8, which is executed with use of the hazard map MAPbelt of the center 100, as described above. If a negative determination is made at the SH20, SH40 corresponding to the function of the vehicle-state determining portion 86 is implemented to determine whether the distance from the other vehicle 110, with which the vehicle 10 is in communication by the vehicle-to-vehicle communication, has become at least the threshold distance. If a negative determination is made at the SH40, SH50 corresponding to the clamping-force control portion 90 is implemented to continues the hydraulic-pressure increasing control. If an affirmative determination is made at the SH40, SH60 corresponding to the clamping-force control portion 90 is implemented to cancel the hydraulic-pressure increasing control.

As described above, in the present fourth embodiment, when the vehicle 10 has been out of one of the hazard areas and a distance from the vehicle 10 to a next one of the hazard areas which the vehicle 10 is likely to enter next is shorter than the threshold distance, the belt clamping force (i.e., friction force) is kept high whereby a hunting causing the belt clamping force to be repeatedly increased and reduced at a short cycle can be prevented.

In the present fourth embodiment, when the belt clamping force was increased based on the pressure-up execution flag received from the other vehicle 100, the belt clamping force is kept high until the distance from the vehicle 10 to the other vehicle 110 becomes the threshold distance or more, whereby the above-described hunting can be prevented.

While the preferred embodiments of this invention have been described in detail by reference to the drawings, it is to be understood that the invention may be otherwise embodied.

For example, in descriptions relating to FIGS. 2-4 in the above-described first embodiment, there have been described examples in which the hazard map MAPbelt associated with the factor causing the belt slippage is used. However, for example, as long as the hydraulic-pressure increasing control is executed in the above-described at least one belt slippy area by using the hazard map MAPbelt received from the center 100, the hazard map MAPbelt does not necessarily have to be associated with the factor causing the belt slippage. In an arrangement with use of the hazard map MAPbelt that is not associated with the factor causing the belt slippage, for example, the SA20 shown in FIG. 2 is not required to be implemented, and the control information Ic generated at the SA30 shown in FIG. 2 is not required to contain the belt-slippage factor information that represents a factor that caused the belt slippage. Further, in this arrangement, the hazard map MAPbelt is prepared without the hazard map MAPbelt being associated with the factor causing the belt slippage in the control routine shown in FIG. 3, and the SC40 is not required to be implemented in the control routine shown in FIG. 4.

In the above-described embodiments, the center 100 owns the hazard map MAPbelt relating to the belt slippage, and updates the hazard map MAPbelt. However, for example, the center 100 may be arranged to have only a function of collecting the control informations Ic from the vehicle 10 and other vehicles 110. In this arrangement, for example, when being located in a certain area, the vehicle 10 receives, from the center 100, the control information Ic containing the location information Svp indicative of the same area, so that the hydraulic-pressure increasing control is executed in accordance with the received control information Ic. In this arrangement, the control information Ic serves as the belt-slip information representing the at least one belt slippy area. Further, the vehicle 10 and/or the other vehicles 110 may prepare the hazard map MAPbelt based on the control information Ic received from the center 100, and the prepared hazard map MAPbelt may be shared among the vehicles that can make the vehicle-to-vehicle communication among the vehicles. Thus, anything done by the vehicle 10 and anything done by the center 100 may be done by either the vehicle 10 or the center 100, except for a certain thing or things that have to be done by only one of them.

It is to be understood that the embodiments and modifications described above are given for illustrative purpose only, and that the present invention may be embodied with various other changes and improvements which may occur to those skilled in the art.

NOMENCLATURE OF ELEMENTS

10: Vehicle
12: Engine (Drive power source)
14: Drive wheels
28: Continuously variable transmission
80: Electronic control device (Control apparatus)
90: Clamping-force control portion (friction-force control portion)
100: Center (External device)
110: Other vehicles (External device)

What is claimed is:

1. A control apparatus for a vehicle provided with a drive power source, drive wheels and a continuously variable transmission that is configured to transmit a drive force from the drive power source to the drive wheels, the continuously variable transmission including pulleys and a belt that is mounted on the pulleys, the control apparatus comprising:
   a friction-force control portion configured to control a friction force acting between the belt and the pulleys of the continuously variable transmission, based on a belt-slip information received from an external device located outside the vehicle, the belt-slip information representing at least one belt slippy area in which a belt slippage is more likely to occur in the continuously variable transmission; wherein:
   the friction-force control portion controls the friction force such that the friction force is made larger in the at least one belt slippy area than in other areas in which the belt slippage is less likely to occur in the continuously variable transmission,
   the belt-slip information is associated with a vehicle situation when the belt slippage occurred,
   the friction-force control portion increases the friction force in the continuously variable transmission, based on a comparison between an actual situation of the vehicle and the vehicle situation associated with the belt-slip information,
   the friction-force control portion is configured to control the friction force, based on the belt-slip information received from, as the external device, a center configured to generate the belt-slip information by collecting a plurality of belt-slippage occurrence information, each of which relates to occurrence of the belt slippage and each of which is associated with a location information,
   the external device includes, in addition to the center, other vehicles that are other than the vehicle, each of the other vehicles being provided with a continuously variable transmission including pulleys and a belt that is mounted on the pulleys, and
   the control apparatus receives the belt-slip information from at least one of the other vehicles, when being unable to receive the belt-slip information from the center.

2. The control apparatus according to claim 1, wherein, when the control apparatus is unable to receive the belt-slip information from the center and the other vehicles do not have the belt-slip information, the friction-force control portion increases the friction force in the continuously variable transmission of the vehicle, based on a pressure-increase information received from at least one of the other vehicles and representing that a friction force acting between the belt and the pulleys of the continuously variable transmission in each of the at least one of the other vehicles was increased.

3. The control apparatus according to claim 1, wherein in a case where the vehicle has been out of one of the at least one belt slippy area represented in the belt-slip information, the friction-force control portion keeps the friction force high when a distance from a non-slippy area in which the vehicle is located in the case to a next one of the at least one belt slippy area which the vehicle is likely to enter next is shorter than a threshold distance.

4. The control apparatus according to claim 3,
   wherein, when the control apparatus is unable to receive the belt-slip information from the external device, the friction-force control portion increases the friction force in the continuously variable transmission of the vehicle, based on a pressure-increase information received from at least one of other vehicles that are other than the vehicle, each of the other vehicles being provided with a continuously variable transmission including pulleys and a belt that is mounted on the pulleys, the pressure-increase information received from the at least one of the other vehicles representing that a friction force acting between the belt and the pulleys of the continuously variable transmission in each of the at least one of the other vehicles was increased, and wherein, when the friction-force control portion increased the friction force in the continuously variable transmission of the vehicle, based on the pressure-increase information received from the at least one of other vehicles, the friction-force control portion keeps the friction force high until a distance from the vehicle to the at least one of other vehicles becomes the threshold distance or more.

5. The control apparatus according to claim 1,
wherein the belt-slip information is associated with a frequency of occurrence of the belt slippage, and
wherein the friction-force control portion changes the friction force in the continuously variable transmission, based on the belt-slip information.

6. The control apparatus according to claim 1,
the control apparatus generates the belt-slippage occurrence information representing that the belt slippage has occurred in the continuously variable transmission, the belt-slippage occurrence information being associated with the location information representing a location of the vehicle when the belt slippage has occurred, and
the control apparatus transmits the belt-slippage occurrence information to the external device via a transceiver provided in the vehicle.

7. The control apparatus according to claim 1,
wherein each of the pulleys has a V-shaped groove which circumferentially extends and which has a variable width, and
wherein the friction-force control portion is a clamping-force control portion configured to control a clamping force by which the belt held in the V-shaped groove of each of the pulleys is clamped by the pulleys, by controlling the variable width of the V-shaped groove, for thereby controlling the friction force acting in the continuously variable transmission.

8. A control apparatus for a vehicle provided with a drive power source, drive wheels and a continuously variable transmission that is configured to transmit a drive force from the drive power source to the drive wheels, the continuously variable transmission including pulleys and a belt that is mounted on the pulleys, the control apparatus comprising:
a processor programmed to:
control a friction force acting between the belt and the pulleys of the continuously variable transmission, based on a belt-slip information received from an external device located outside the vehicle, the belt-slip information representing at least one belt slippy area in which a belt slippage is more likely to occur in the continuously variable transmission; wherein:
the processor controls the friction force such that the friction force is made larger in the at least one belt slippy area than in other areas in which the belt slippage is less likely to occur in the continuously variable transmission,
the belt-slip information is associated with a vehicle situation when the belt slippage occurred,
the processor increases the friction force in the continuously variable transmission, based on a comparison between an actual situation of the vehicle and the vehicle situation associated with the belt-slip information, the processor is configured to control the friction force, based on the belt-slip information received from, as the external device, a center configured to generate the belt-slip information by collecting a plurality of belt-slippage occurrence information, each of which relates to occurrence of the belt slippage and each of which is associated with a location information, the external device includes, in addition to the center, other vehicles that are other than the vehicle, each of the other vehicles being provided with a continuously variable transmission including pulleys and a belt that is mounted on the pulleys, and the control apparatus receives the belt-slip information from at least one of the other vehicles, when being unable to receive the belt-slip information from the center.

9. The control apparatus according to claim 8, wherein, when the control apparatus is unable to receive the belt-slip information from the center and the other vehicles do not have the belt-slip information, the processor increases the friction force in the continuously variable transmission of the vehicle, based on a pressure-increase information received from at least one of the other vehicles and representing that a friction force acting between the belt and the pulleys of the continuously variable transmission in each of the at least one of the other vehicles was increased.

10. The control apparatus according to claim 8, wherein in a case where the vehicle has been out of one of the at least one belt slippy area represented in the belt-slip information, the processor keeps the friction force high when a distance from a non-slippy area in which the vehicle is located in the case to a next one of the at least one belt slippy area which the vehicle is likely to enter next is shorter than a threshold distance.

11. The control apparatus according to claim 10,
wherein, when the control apparatus is unable to receive the belt-slip information from the external device, the processor increases the friction force in the continuously variable transmission of the vehicle, based on a pressure-increase information received from at least one of other vehicles that arc other than the vehicle, each of the other vehicles being provided with a continuously variable transmission including pulleys and a belt that is mounted on the pulleys, the pressure-increase information received from the at least one of the other vehicles representing that a friction force acting between the belt and the pulleys of the continuously variable transmission in each of the at least one of the other vehicles was increased, and wherein, when the processor increased the friction force in the continuously variable transmission of the vehicle, based on the pressure-increase information received from the at least one of other vehicles, the processor keeps the friction force high until a distance from the vehicle to the at least one of other vehicles becomes the threshold distance Or more.

12. The control apparatus according to claim 8,
wherein the belt-slip information is associated with a frequency of occurrence of the belt slippage, and
wherein the processor changes the friction force in the continuously variable transmission, based on the belt-slip information.

13. The control apparatus according to claim 8, wherein the processor is further programmed to:
- generate the belt-slippage occurrence information representing that the belt slippage has occurred in the continuously variable transmission, the belt-slippage occurrence information being associated with the location information representing a location of the vehicle when the belt slippage has occurred, and
- transmit the belt-slippage occurrence information to the external device via a transceiver provided in the vehicle.

14. The control apparatus according to claim 8,
- wherein each of the pulleys has a V-shaped groove which circumferentially extends and which has a variable width, and
- wherein the processor is further programmed to:
    - control a clamping force by which the belt held in the V-shaped groove of each of the pulleys is clamped by the pulleys, by controlling the variable width of the V-shaped groove, for thereby controlling the friction force acting in the continuously variable transmission.

* * * * *